United States Patent
Kimba Dit Adamou et al.

(10) Patent No.: US 11,832,225 B2
(45) Date of Patent: Nov. 28, 2023

(54) METHOD AND DEVICE FOR CONFIGURING RELAY RESOURCE

(71) Applicant: VIVO MOBILE COMMUNICATION CO., LTD., Guangdong (CN)

(72) Inventors: Boubacar Kimba Dit Adamou, Chang'an Dongguan (CN); Xueming Pan, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/061,319

(22) Filed: Oct. 1, 2020

(65) Prior Publication Data

US 2021/0022136 A1 Jan. 21, 2021

Related U.S. Application Data

(63) Continuation of application No. PCT/CN2019/080988, filed on Apr. 2, 2019.

(30) Foreign Application Priority Data

Apr. 3, 2018 (CN) .......................... 201810295818.9

(51) Int. Cl.
- *H04W 72/04* (2023.01)
- *H04W 40/22* (2009.01)
- *H04L 5/14* (2006.01)
- *H04W 72/0446* (2023.01)
- *H04W 72/0453* (2023.01)

(52) U.S. Cl.
CPC ........... *H04W 72/0446* (2013.01); *H04L 5/14* (2013.01); *H04W 40/22* (2013.01); *H04W 72/0453* (2013.01)

(58) Field of Classification Search
CPC ............. H04W 72/0446; H04W 40/22; H04W 72/0453; H04L 5/14
See application file for complete search history.

(56) References Cited

U.S. PATENT DOCUMENTS

| 10,237,759 B1 * | 3/2019 | Marupaduga ......... H04L 5/0035 |
| 2010/0002656 A1 | 1/2010 | Ji et al. |

(Continued)

FOREIGN PATENT DOCUMENTS

| CN | 101577969 A | 11/2009 |
| CN | 102474802 A | 5/2012 |

(Continued)

OTHER PUBLICATIONS

Japanese Office Action from corresponding JP Application No. 2020-554269, dated Dec. 16, 2021.

(Continued)

*Primary Examiner* — Bailor C Hsu
(74) *Attorney, Agent, or Firm* — Maschoff Brennan

(57) ABSTRACT

A method and a device for configuring a relay resource are provided. The method is applied to a target device accessed by a relay device and includes: transmitting a relay resource configuration message to the relay device, where the relay resource configuration message carries at least one of: information of a resource of a time window, information of a resource for a backhaul or information of a resource for an access link, of the relay device.

20 Claims, 8 Drawing Sheets

(56) References Cited

U.S. PATENT DOCUMENTS

| | | | |
|---|---|---|---|
| 2011/0128893 A1 | 6/2011 | Park et al. | |
| 2011/0194482 A1 | 8/2011 | Ji et al. | |
| 2012/0069790 A1 | 3/2012 | Chung et al. | |
| 2012/0300641 A1* | 11/2012 | Chen | H04L 1/0026 370/241 |
| 2013/0034043 A1 | 2/2013 | Yu et al. | |
| 2013/0242771 A1 | 9/2013 | Ohta et al. | |
| 2015/0189652 A1 | 7/2015 | Mizusawa | |
| 2017/0064731 A1 | 3/2017 | Wang et al. | |
| 2018/0035435 A1 | 2/2018 | Gupta et al. | |
| 2018/0092139 A1* | 3/2018 | Novlan | H04W 76/12 |
| 2019/0199424 A1* | 6/2019 | Li | H04L 43/0852 |
| 2019/0215055 A1* | 7/2019 | Majmundar | H04B 7/15521 |
| 2019/0223002 A1* | 7/2019 | Novlan | H04W 8/22 |
| 2019/0289492 A1* | 9/2019 | Hampel | H04W 28/0263 |
| 2019/0305923 A1* | 10/2019 | Luo | H04L 5/16 |
| 2019/0313433 A1* | 10/2019 | Abedini | H04L 5/0044 |
| 2020/0052775 A1* | 2/2020 | Nam | H04B 17/336 |
| 2020/0137611 A1* | 4/2020 | Majmundar | H04W 28/0284 |
| 2020/0145997 A1* | 5/2020 | Luo | H04W 88/04 |
| 2020/0154336 A1* | 5/2020 | Islam | H04B 17/382 |
| 2021/0051768 A1* | 2/2021 | Li | H04W 76/27 |
| 2021/0212070 A1* | 7/2021 | Luo | H04W 72/14 |
| 2021/0400711 A1* | 12/2021 | Liu | H04W 40/22 |
| 2021/0410058 A1* | 12/2021 | Dey | H04W 40/04 |
| 2022/0321284 A1* | 10/2022 | Luo | H04L 5/001 |
| 2022/0386219 A1* | 12/2022 | Akl | H04W 40/24 |

FOREIGN PATENT DOCUMENTS

| | | |
|---|---|---|
| CN | 103875297 A | 6/2014 |
| CN | 104521267 A | 4/2015 |
| CN | 106506424 A | 3/2017 |
| JP | 2011529318 A | 12/2011 |
| KR | 10-2007-0048575 A | 5/2007 |
| KR | 20100014190 A | 2/2010 |
| WO | 2011/111113 A1 | 9/2011 |

OTHER PUBLICATIONS

3GPP, "Way Forward—IAB Architecture for L2f3 relaying," Qualcomm Inc, KDDI, AT&T, Nokia, Nokia Shangai Bell, Huawi, Ericsson, Intel, LG Electronics, CMCC, Samsung, Athens, Greece, Jan. 26-Mar. 2, 2018, 6 pages.

CN Search Report in Application No. 201810295818.9 dated Mar. 26, 2020.

Written Opinion and International Search Report in Application No. PCT/CN2019/080988 dated Oct. 15, 2020.

"Consideration on IAB physical layer enhancement" 3GPP TSG RAN WG1 Meeting #91, R-1720606, Nov. 27, 2017.

"On RAN architecture for IAB relaying in NR" 3GPP TSG-RAN3 Meeting #99, R3-181351, Feb. 26, 2018.

EP Search Report in Application No. 19781635.8 dated May 26, 2021.

CN Office Action in Application No. 201810295818.9 dated Apr. 2, 2021.

"Evaluation on the dynamic and flexible resource allocation in IAB" 3GPP TSG RAN WG1 NR Ad Hoc Meeting #4, Huawei, HiSilicon, R1-1800289, Jan. 22, 2018.

KR Office Action in Application No. 10-2020-7030951 dated Aug. 26, 2022.

AT&T., "Wireless backhaul/relay for NR," 3GPP TSG RAN WG1 Meeting #86, R1-166488, pp. 1-4, (Aug. 22-26, 2016).

KR Office Action dated Jul. 21, 2023 as received in Application No. 10-2020-7030951.

\* cited by examiner

METHOD AND DEVICE FOR CONFIGURING RELAY RESOURCE

CROSS-REFERENCE TO RELATED APPLICATION

This application is continuation application of PCT International Application No. PCT/CN2019/080988 filed on Apr. 2, 2019, which claims a priority to Chinese Patent Application No. 201810295818.9 filed on Apr. 3, 2018, the disclosures of which are incorporated in their entireties by reference herein.

TECHNICAL FIELD

The present disclosure relates to the field of communications, and in particular to a method and a device for configuring a relay resource.

BACKGROUND

Relay (relay) technology is to add one or more relay nodes between a base station and a terminal, to perform one or more times of forwarding on a radio signal. That is, the radio signal needs to go through multiple hops to reach the terminal. A simple two-hop relay is taken as an example, i.e., a base station-terminal link is divided into two links: a base station-relay station link and a relay station-terminal link, so that there is an opportunity to replace a link having poor quality with two links having relative good quality, to obtain higher link capacity and better coverage.

In 5G technology, research is performed on using radio relay as backhaul. Radio relay backhaul technology includes adoption of radio backhaul link above 6 GHz. The higher the network frequency band is, the shorter the transmission distance of radio backhaul is. In order to effectively achieve multiple better transmissions, distances of radio backhauls will be shorter and the deployment will be denser. For co-frequency deployment, how to coordinate relay resources and avoid resource conflict is a technical problem to be solved.

SUMMARY

Embodiments of the present disclosure are to provide a method and a device for configuring a relay resource to coordinate relay resources of a relay device, avoid relay resource conflict, and improve robustness of relay communication.

In a first aspect, a method for configuring a relay resource is provided, which includes:

transmitting a relay resource configuration message to a relay device, where the relay resource configuration message carries at least one of: information of a resource of a time window, information of a resource for a backhaul or information of a resource for an access link, of the relay device.

In a second aspect, a method for configuring a relay resource is provided, which includes:

receiving a relay resource configuration message, where the relay resource configuration message carries at least one of: information of a resource of a time window, information of a resource for a backhaul, or information of a resource for an access link, of a relay device; and configuring the resource for the backhaul and/or the resource for the access link of the relay device, based on the relay resource configuration message.

In a third aspect, a device is provided, the device is configured to be accessed by a relay device, and the device includes:

a first transmitting module, configured to transmit a relay resource configuration message to the relay device, where the relay resource configuration message carries at least one of: information of a resource of a time window, information of a resource for a backhaul or information of a resource for an access link, of the relay device.

In a fourth aspect, a relay device is provided, which includes:

a receiving module, configured to receive a relay resource configuration message, where the relay resource configuration message carries at least one of: information of a resource of a time window, information of a resource for a backhaul, or information of a resource for an access link, of the relay device; and a configuration module, configured to configure the resource for the backhaul and/or the resource for the access link of the relay device, based on the relay resource configuration message.

In a fifth aspect, a device is provided. The device is configured to be accessed by a relay device. The device includes a memory, a processor, and a computer program stored in the memory and executable by the processor, and the computer program, when being executed by the processor, performs the steps of the method according to the first aspect.

In a sixth aspect, a relay device is provided. The relay device includes a memory, a processor, and a computer program stored on the memory and executable by the processor, where the computer program, when being executed by the processor, performs the steps of the method according to the second aspect.

In a seventh aspect, a computer-readable storage medium is provided. A computer program is stored on the computer-readable storage medium. The computer program, when being executed by a processor, performs the steps of the method according to the first aspect.

In an eighth aspect, a computer-readable storage medium is provided. A computer program is stored on the computer-readable storage medium. The computer program, when being executed by a processor, performs the steps of the method according to the second aspect.

In the embodiments of the present disclosure, the relay resource configuration message is transmitted for the relay device so as to configure the relay resource of the relay device. In this way, relay resource conflict of the relay device can be avoided and robustness of relay communication can be improved.

BRIEF DESCRIPTION OF THE DRAWINGS

The drawings described herein are used to facilitate further understanding of the present disclosure and form a part of the present disclosure. The exemplary embodiments of the present disclosure and the descriptions thereof are used to explain the present disclosure, and do not constitute an improper limitation of the present disclosure. In the drawings.

DETAILED DESCRIPTION

The technical solutions in embodiments of the present disclosure are described clearly in conjunction with drawings in the embodiments of the present disclosure. Apparently, the described embodiments are merely a part of rather than all the embodiments of the present disclosure. All other embodiments obtained by a person ordinary skilled in the art based on the embodiments of the present disclosure without any creative efforts fall within the protection scope of the present disclosure.

The technical solutions according to the present disclosure may be applied to various communication systems, such as: global system of mobile communication (Global System of Mobile communication, GSM), code division multiple access (Code Division Multiple Access, CDMA) system, wideband code division multiple access (Wideband Code Division Multiple Access, WCDMA), general packet radio service (General Packet Radio Service, GPRS), long term evolution (Long Term Evolution, LTE)/long term evolution advanced (Long Term Evolution advanced, LTE-A), or, new radio (New Radio, NR).

The technical solutions provided by the embodiments of the present disclosure are described in detail hereinafter with reference to the drawings.

Figure 1:
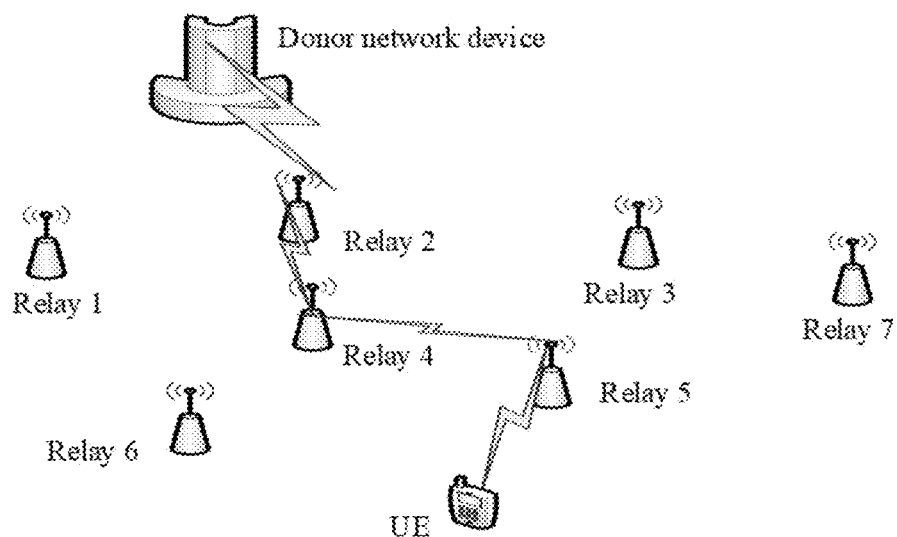
FIG. 1 is a schematic diagram of an application scenario according to an embodiment of the present disclosure.

It should be understood that in the communication where relay exists, one or more times of forwarding are need for the communication between a base station and a user equipment, that is, a radio signal needs go through multiple hops to reach the user equipment from the base station, or reach the base station from the user equipment. FIG. 1 is a schematic diagram of an application scenario according to an embodiment of the present disclosure. As shown in FIG. 1, a radio signal from the UE in FIG. 1 needs to go through relay 5, relay 4, and relay 2 to reach the donor (Donor) network device in FIG. 1. The donor (Donor) network device is a device via which a relay device accesses a core network, and the donor network device may be understood as a base station for the relay device.

It should be understood that, IAB is aimed at reusing conventional functions and interfaces defined for access. Specifically, mobile-termination (Mobile-Termination, MT), gNB-DU, gNB-CU, UPF, AMF and SMF, and corresponding interfaces: NR Uu (between MT and gNB), F1, NG, X2 and N4, are used as basic modules of the IAB network structure.

The mobile-termination (MT) function is defined as a component of a mobile device. In the present disclosure, MT is referred to as a function of camping on an IAB node, and the function is used to terminate a radio interface layer of a backhaul Uu interface that points to a DIAB or other IAB node.

In the IAB network structure of the present disclosure, DIAB is regarded as a single logical node having a group of functions. The single node represents that the DIAB being divided into distributed entity or centralized entity is not excluded.

It should be understood that in the embodiments of the present disclosure, IAB may be a stand-alone IAB device, or may be divided into distributed entity or centralized entity; DIAB may be a stand-alone DIAB device, or may be divided into distributed entity or centralized entity.

Figure 2:
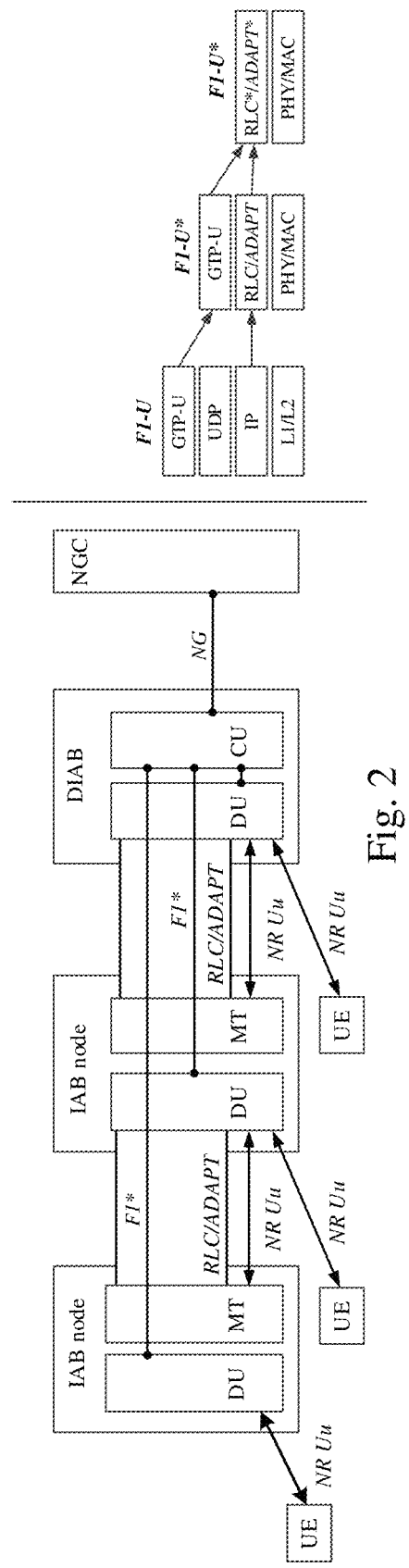
FIG. 2 is a schematic diagram of a scene of communication between an IAB and a DIAB according to an embodiment of the present disclosure.

FIG. 2 is a schematic diagram of a scene of communication between IAB and DIAB in an embodiment of the present disclosure. As shown in FIG. 2, IAB communicates with donor base station (DIAB) via a radio interface, and IAB communicates with IAB via a radio interface. In the scenario shown in FIG. 2, the backhaul of F1-U uses the adaptation layer, or uses the GTP-U combined with the adaptation layer; in addition, hop-by-hop forward across an intermediate node uses the adaptation layer.

Figure 3:
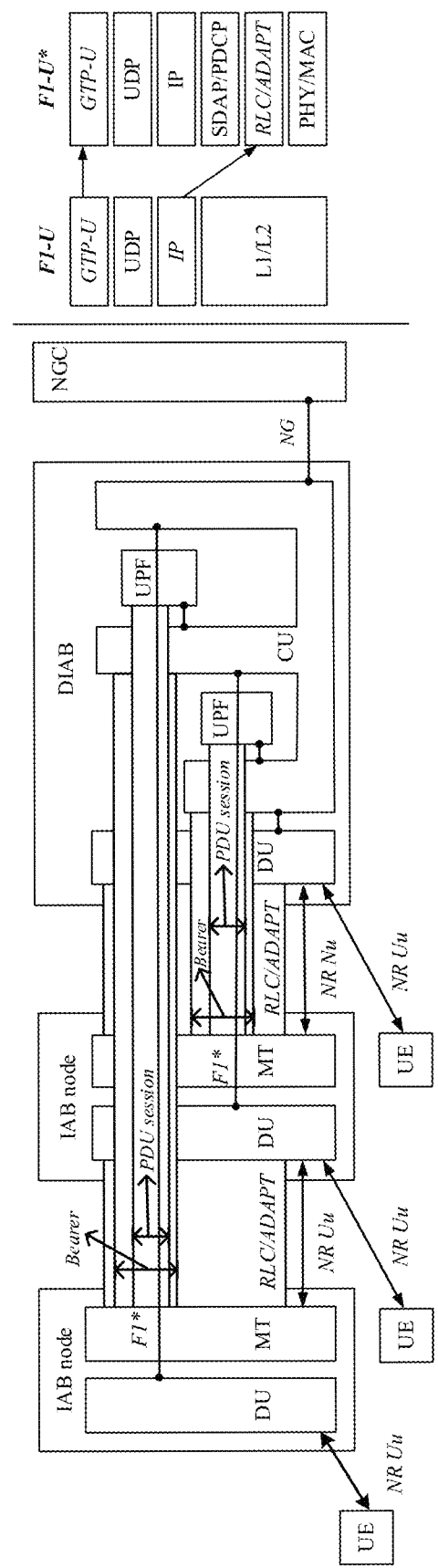
FIG. 3 is a schematic diagram of a scene of communication between an IAB and a DIAB according to another embodiment of the present disclosure.

FIG. 3 is a schematic diagram of a scene of communication between IAB and DIAB in another embodiment of the present disclosure. As shown in FIG. 3, IAB communicates with donor base station (DIAB) via a radio interface, and IAB communicates with IAB via a radio interface. In the scenario shown in FIG. 3, the backhaul from F1-U or NG-U to the access node uses GTP-U/UDP/IP; in addition, hop-by-hop forward across an intermediate node uses PDU session layer routing.

Figure 4:
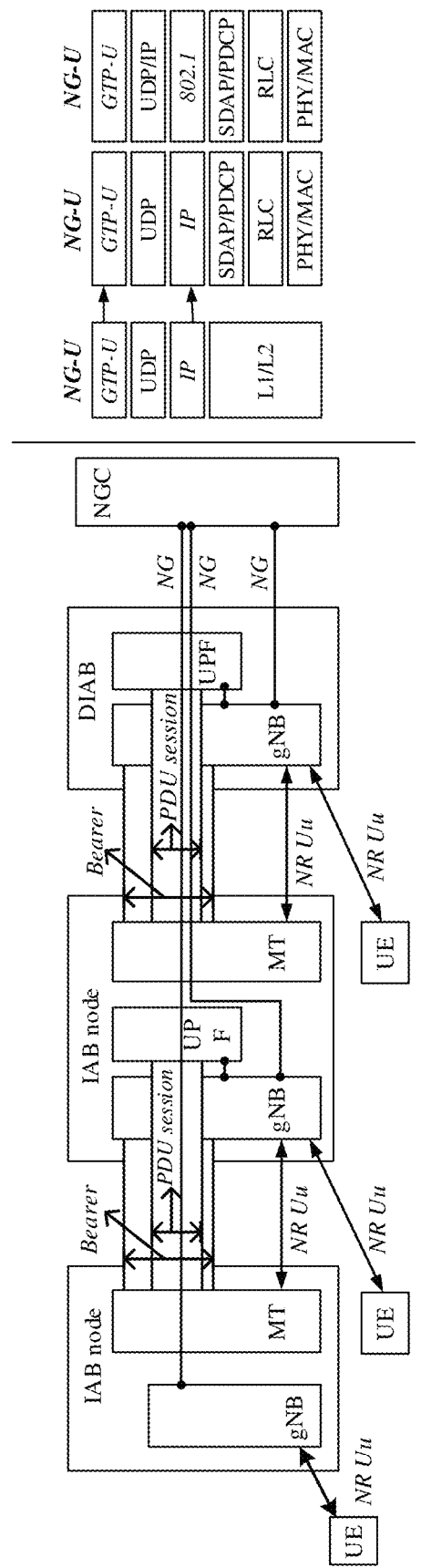
FIG. 4 is a schematic diagram of a scene of communication between an IAB and a DIAB according to another embodiment of the present disclosure.

FIG. 4 is a schematic diagram of a scene of communication between IAB and DIAB in another embodiment of the present disclosure. As shown in FIG. 4, IAB communicates with donor base station (DIAB) via a radio interface, and IAB communicates with IAB via a radio interface. In the scenario shown in FIG. 4, the backhaul from NG-U to the access node uses GTP-U/UDP/IP; in addition, hop-by-hop forward across an intermediate node uses PDU session layer routing.

Figure 5:
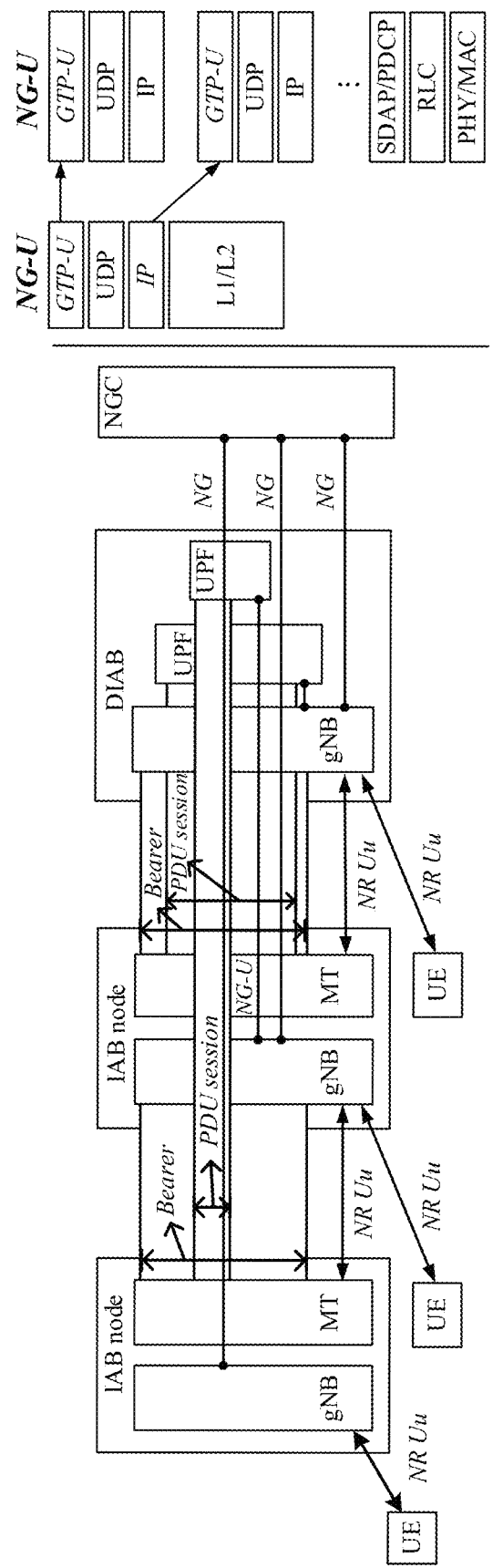
FIG. 5 is a schematic diagram of a scene of communication between an IAB and a DIAB according to another embodiment of the present disclosure.

FIG. 5 is a schematic diagram of a scene of communication between IAB and DIAB in another embodiment of the present disclosure. As shown in FIG. 5, IAB communicates with donor base station (DIAB) via a radio interface, and IAB communicates with IAB via a radio interface. In the scenario shown in FIG. 5, the backhaul from NG-U to the access node uses GTP-U/UDP/IP; in addition, hop-by-hop forward across an intermediate node uses PDU session layer routing.

Figure 6:
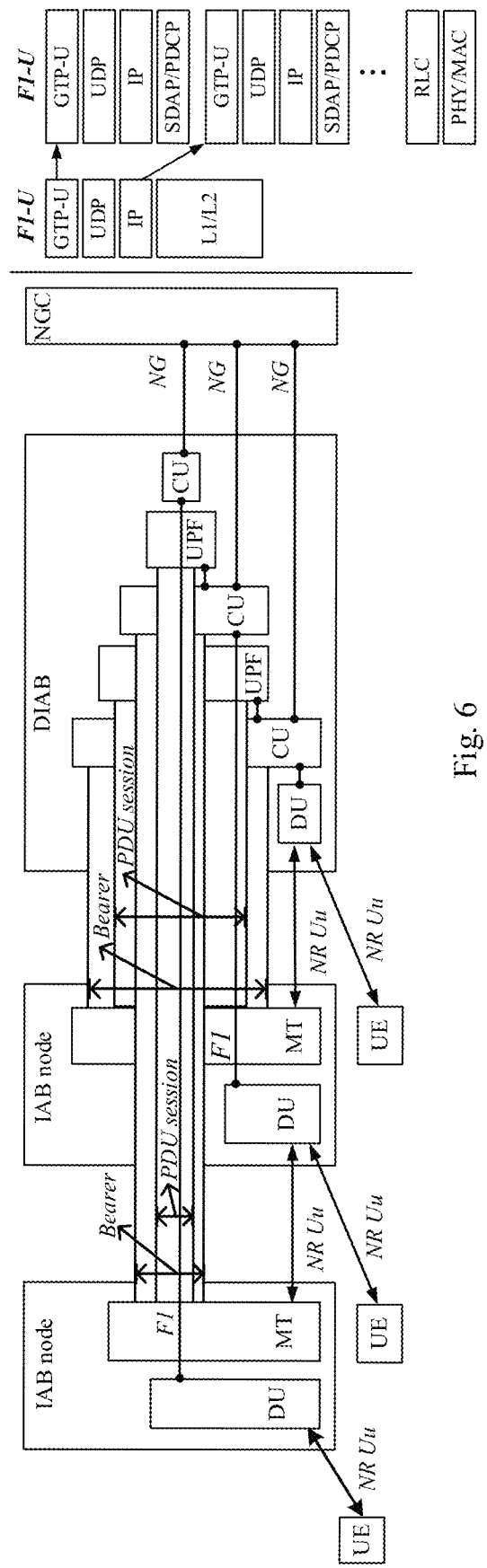
FIG. 6 is a schematic diagram of a scene of communication between an IAB and a DIAB according to another embodiment of the present disclosure.

FIG. 6 is a schematic diagram of a scene of communication between IAB and DIAB in another embodiment of the present disclosure. As shown in FIG. 6, IAB communicates with donor base station (DIAB) via a radio interface, and IAB communicates with IAB via a radio interface. In the scenario shown in FIG. 6, the backhaul from NG-U to the access node uses GTP-U/UDP/IP; in addition, hop-by-hop forward across an intermediate node uses PDU session layer routing.

It should be understood that FIGS. 1 to 6 merely illustrate some application scenarios of the technical solutions of the embodiments of the present disclosure, and the application scenarios of the technical solutions of the embodiments of the present disclosure are not limited thereto.

Hereinafter, the method according to the embodiments of the present disclosure will be described with reference to FIGS. 1 to 6.

Figure 7:
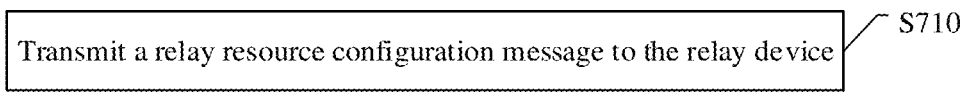
FIG. 7 is a flowchart of a method for configuring a relay resource according to an embodiment of the present disclosure.

FIG. 7 is a flowchart of a method for configuring a relay resource according to an embodiment of the present disclosure. The method in FIG. 7 is applied to a target device accessed by a relay device. The method in FIG. 7 may include the following steps.

S710 includes: transmitting a relay resource configuration message to the relay device.

The relay resource configuration message carries at least one of: information of a resource of a time window, information of a resource for a backhaul or information of a resource for an access link, of the relay device.

In the embodiments of the present disclosure, by transmitting the relay resource configuration message to the relay device, normal configuration and use of the relay resource of the relay device can be ensured, congestion and interference of the network resource of the relay device can be avoided, and robustness of the relay communication can be improved.

It should be understood that the relay resource configuration message may be transmitted to the relay device through radio resource control (Radio Resource Control, RRC) or media access control (Media Access Control, MAC) control element (Control Element, CE).

It should be understood that the resource of the time window is indicated by a time window index or a time window bitmap. For example, the index of the time window allocated to the relay device is indicated. As another example, the time window bitmap is used to indicate which time window resources are available to the relay device. A time window corresponding to a bit set to be 1 in the time window bitmap is a time window resource available to the relay device.

Optionally, in some embodiments, the target device is a stand-alone donor integrated access and backhaul (Donor Integrated Access and Backhaul, DIAB) device, and the relay device is a stand-alone integrated access and backhaul (Integrated Access and Backhaul, IAB) device. For example, the target device may be the donor (Donor) network device according to the embodiment shown in FIG. 1, and the relay device may be relay 2.

Optionally, in some embodiments, the target device is a centralized unit (Centralized Unit, CU) of an IAB, and the relay device is a distributed unit (Distributed Unit, DU) of the IAB.

Optionally, in some embodiments, the target device is a CU of a DIAB, and the relay device is a DU of the DIAB.

Optionally, in some embodiments, the target device is a CU of a DIAB, and the relay device is a CU in an IAB that accesses the DIAB.

It should be understood that in the above embodiment where the target device is the CU of the DIA, before step S710, the method may further include: determining a relay resource of a DU of the DIAB and/or a relay resource of an IAB of the DIAB, based on relay resource demand information reported by the IAB of the DIAB.

In this case, the CU of the DIAB may negotiate, based on the relay resource demand information reported by the IAB, to allocate the relay resources of the relay device managed by the DIAB, and transmit the allocated relay resources to the DU of the DIAB and the CU under the IAB of the DIAB through the relay resource configuration message.

Optionally, in some embodiments, a transmission time resource for transmitting the relay resource configuration message is before an earliest time resource configured by the relay resource configuration message, and a time interval between the transmission time resource and the earliest time resource is determined based on a backhaul latency and an internal processing latency of the relay device.

Further, in some embodiments, the backhaul latency is determined by the target device and/or the relay device through evaluating.

It should be understood that the internal processing latency of the relay device is determined based on the internal processing capability and algorithm of the relay device.

In addition, the backhaul latency may be evaluated and determined by the target device, or by the relay device, or evaluated and determined by the target device and the relay device.

Optionally, in some embodiments, the resource for the backhaul of the relay device includes at least one of the following:

a resource for a backhaul from the target device to the relay device in a time window; or, a resource for a backhaul from the relay device to the target device in a time window.

It should be understood that, based on the information of the resource for the backhaul in the relay resource configuration message, the relay device may configure the resource for the backhaul of the relay device.

Optionally, in some embodiments, the resource for the access link of the relay device includes at least one of:

a resource that is not indicated to be used for backhaul transmission in a time window;

a resource for an access link to the relay device from a user equipment accessing the relay device;

a resource for an access link from the relay device to a user equipment accessing the relay device;

a resource for a backhaul to the relay device from a subordinate relay device accessing the relay device; or, a resource for a backhaul from the relay device to a subordinate relay device.

It should be understood that, based on the information of the resource for the access link in the relay resource configuration message, the relay device may configure the resource for the access link of the relay device.

Optionally, in some embodiments, in a case that a carrier type of a first resource configured in the relay resource configuration message is a frequency division duplex (Frequency Division Duplex, FDD) downlink carrier, the relay resource configuration message further indicates that a time domain resource of the first resource is a downlink backhaul time domain resource or a downlink non-backhaul time domain resource.

Or, optionally, in some embodiments, in a case that a carrier type of a second resource configured in the relay resource configuration message is an FDD uplink carrier, the relay resource configuration message further indicates that a time domain resource of the second resource is an uplink backhaul time domain resource or an uplink non-backhaul time domain resource.

Or, optionally, in some embodiments, in a case that a carrier type of a third resource configured in the relay resource configuration message is a time division duplex (Time Division Duplex, TDD) carrier, the relay resource configuration message further indicates that a time domain resource of the third resource is an uplink backhaul time domain resource, a downlink backhaul time domain resource or a non-backhaul time domain resource.

Further, in some embodiments, in a case that the relay resource configuration message indicates that the time domain resource of the third resource is the non-backhaul time domain resource, the relay resource configuration message further indicates that the third resource is a downlink non-backhaul time domain resource, an uplink non-backhaul time domain resource, or an uplink-and-downlink-variable non-backhaul time domain resource.

Optionally, in some embodiments, the time window is allocated to the relay device in advance.

Or, optionally, in some embodiments, the time window is configured by the target device for the relay device.

Optionally, in some embodiments, after step S710, the method further includes:

transmitting a time window reconfiguration message to the relay device through RRC or MAC CE, where the time window reconfiguration message is used to reconfigure a time window resource available to the relay device.

The time window resource is indicated by a time window index or a time window bitmap.

By transmitting the time window reconfiguration message to the relay device, the time window resource capable of being used by the relay device can be readjusted.

Descriptions are provided hereinafter in conjunction with specific embodiments.

First Embodiment

The IAB network includes a CU and several DUs. The CU is a DIAB, and the DUs are IABs. The DIAB and the IABs are stand-alone base stations.

In the embodiments of the present disclosure, the CU may configure a resource for each DU in the IAB network and deliver it to the DU. The configured resource includes a time domain resource and a frequency resource.

For example, the CU may indicate, through signaling, to the DU in advance, a resource set used for backhaul transmission.

The signaling may be a PDCCH or L2 signaling, such as MAC-CE or RRC signaling. The resource carried in the signaling may be indicated by a resource index or a resource bitmap.

For example, the signaling may indicate a time resource set used for backhaul transmission in a time window (time window) in the future, which includes at least one of the following:

downlink backhaul time resource (DL backhaul time resource), i.e., the DU needs to receive a signal of the CU in the DL backhaul time resource set;

uplink backhaul time resource (UL backhaul time resource), i.e., the DU is allowed to transmit a signal to the CU in the UL backhaul time resource set; or, a time resource set that is not indicated to be used for backhaul transmission in a time window (time window). It should be understood that for the time resource set that is not indicated to be used for backhaul transmission, signal reception/transmission does not need to be performed by the DU with CU.

It should be understood that at least one of the following may be further indicated in the above signaling:

for an FDD DL carrier (carrier), the CU may indicate that a time resource is for DL backhaul, or DL non-backhaul;

for an FDD DL carrier, the donor gNB may indicate that a time resource is for UL backhaul or UL non-backhaul; or, for a TDD carrier, the CU may indicate that a time resource is for DL backhaul or UL backhaul, or non-backhaul.

In particular, for a non-backhaul time resource, the CU may further indicate that the time resource is a DL time resource, an UL time resource, or a DL/UL variable time resource.

It should be understood that the above time window may be allocated to the DU through predefining, for example, it is equal to one or more radio frame (radio frame) periods. Or, it is configured by the DU under the CU.

In addition, in a case that a time window (time window) needs to be reconfigured, the CU may indicate to the DU through RRC or MAC CE signaling. The manner of indicating may be based on a time window index or a time window bitmap.

In addition, based on the backhaul latency and the internal processing latency of the DU, the DU needs to know whether a time resource is used for DL backhaul, or UL backhaul, or non-backhaul, by a time of X in advance (X is in units of slots or symbols).

The DU processing time is evaluated by the DU, and the backhaul latency is evaluated by the CU and/or the DU.

It should be understood that in a case that the CU uses the bitmap method, a method such as a MBFSN subframe configuration method is adopted. The CU configures the time resource and the time window as discrete bitmaps and transmits them to the DU through MAC-CE or RRC signaling.

In the foregoing methods, only the time resource for the backhaul is configured. In specific applications, the frequency domain resource for the backhaul may also be configured, or both the time resource and frequency domain resource for the backhaul may be configured, which is not limited in the embodiments of the present disclosure.

Correspondingly, the DU may learn, based on the signaling transmitted by the CU, the time resource set that may be used for the interface (access link) between the DU and the UE, or the time resource set of the interface between the DU and a subordinate DU that accesses the DU.

For example, on an FDD DL carrier, a DL non-backhaul time resource may be used by the DU to transmit a DL signal to the UE served by the DU.

For example, on an FDD UL carrier, a UL non-backhaul time resource may be used by the DU to receive an UL signal transmitted by the UE served by the DU.

For example, on a TDD carrier, the DU may determine by itself that a non-backhaul time resource is used for access link DL transmission or access link UL transmission.

In addition, optionally, the DU may determine, based on a signaling notification, that a non-backhaul time resource is used for access link DL transmission or access link UL transmission.

It should be understood that in a case that the DU supports the bitmap indication, the DU may obtain the available time resource and time window according to bits of the CU that are set to be 1 in the bitmap. The available time resource and time window are configured to include backhaul and access link resources.

Second Embodiment

The DIAB includes a CU and at least one DU, and the IAB includes a CU and at least one DU.

In this case, DIAB configures time resource sets and resources of time windows in a centralized manner, and delivers them to the DUs of DIAB and the CU of other IAB. The CU of each IAB delivers them to the DUs under the corresponding IAB. The methods, in which the DIAB configures resources for the DUs of the DIAB, the DIAB configures resources for the CU of other IAB, and the CU of the IAB configures resources for the DUs under the corresponding IAB, are similar to the configurations in the above embodiment, which are not repeated.

Optionally, the DAIB and the IAB may negotiate the time resource and the resource of the time window first. For example, the DAIB may perform configuring based on the resource demand situation of the DU under each IAB. Then, each IAB and the DIAB deliver configured resources to the related DUs.

It should be understood that although the relay resources in the first embodiment and the second embodiment only use time resources and resources of time windows as examples, in practical applications the relay resource may include a resource in a frequency domain and a resource on an air interface, etc., which are not limited by the embodiments of the present disclosure.

Figure 8:
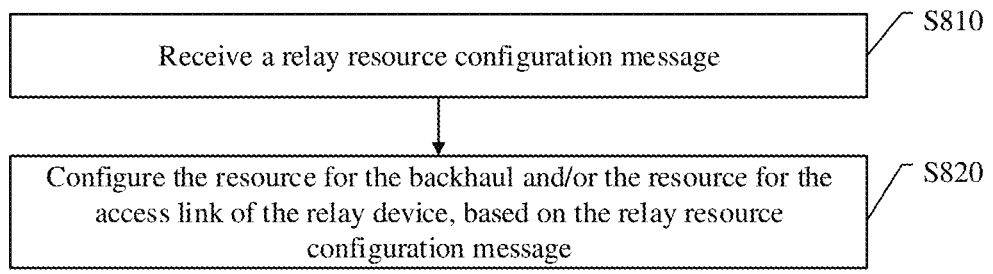
FIG. 8 is a flowchart of a method for configuring a relay resource according to an embodiment of the present disclosure.

FIG. 8 is a flowchart of a method for configuring a relay resource according to an embodiment of the present disclosure. This method is applied to a relay device. As shown in FIG. 8, the method may include the following steps.

S810 includes: receiving a relay resource configuration message.

The relay resource configuration message carries at least one of: information of a resource of a time window, information of a resource for a backhaul, or information of a resource for an access link, of the relay device.

S820 includes: configuring the resource for the backhaul and/or the resource for the access link of the relay device, based on the relay resource configuration message.

In the embodiments of the present disclosure, the relay device receives the relay resource configuration message, and configures the relay resource of the relay device based on the relay resource configuration message, so as to ensure normal configuration and use of the relay resource of the relay device, avoid congestion and interference of network resources of the relay device, and improve robustness of the relay communication.

Optionally, in some embodiments, the relay device is a stand-alone IAB device, and a target device accessed by the relay device is a DIAB device accessed by the IAB device.

Or, optionally, in some embodiments, the relay device is a distributed unit DU of an IAB, and the target device is a centralized unit CU of the IAB.

Or, optionally, in some embodiments, the relay device is a DU of a DIAB, and the target device is a CU of the DIAB.

Or, optionally, in some embodiments, the relay device is a CU in an IAB, and the target device is a CU of a DIAB accessed by the IAB.

Optionally, in some embodiments, in a case that the relay device is the CU in the IAB and the target device is the CU of the DIAB accessed by the IAB, before step S810, the method further includes:

transmitting relay resource demand information of the IAB to the target device, where the relay resource demand information is used by the target device to coordinate relay resource configuration of a DU and/or the IAB under the target device.

In the embodiments of the present disclosure, by transmitting the relay resource demand information to the target device, the target device can be requested to configure the relay resource based on the relay resource demand of the relay device, so that the target device can coordinate the relay resource configuration of the DU and/or the IAB under the target device.

Optionally, in some embodiments, the resource for the backhaul of the relay device includes at least one of the following:

a resource for a backhaul from a target device to the relay device in a time window; or, a resource for a backhaul from the relay device to a target device in a time window.

Further, in some embodiments, step S820 may specifically include:

configuring a downlink backhaul resource of the relay device based on information of a resource for a first backhaul, in a case that the relay resource configuration message carries the information of the resource for the first backhaul from the target device to the relay device in the time window.

Or, further, in some embodiments, step S820 may specifically include: configuring an uplink backhaul resource of the relay device based on information of a resource for a second backhaul, in a case that the relay resource configuration message carries the information of the resource for the second backhaul from the relay device to the target device in the time window.

Optionally, in some embodiments, the resource for the access link of the relay device includes at least one of:

a resource that is not indicated to be used for backhaul transmission in a time window;

a resource for an access link to the relay device from a user equipment accessing the relay device;

a resource for an access link from the relay device to a user equipment accessing the relay device;

a resource for a backhaul to the relay device from a subordinate relay device accessing the relay device; or, a resource for a backhaul from the relay device to a subordinate relay device.

Further, in some embodiments, step S820 may specifically include:

configuring the resource for the access link of the relay device based on information of the resource that is not indicated to be used for backhaul transmission in the time window, in a case that the relay resource configuration message carries the information of the resource that is not indicated to be used for backhaul transmission in the time window.

Or, optionally, in some embodiments, step S820 may specifically include:

configuring an uplink access link resource of the relay device based on information of a resource for a first access link, in a case that the relay resource configuration message carries the information of the resource for the first access link to the relay device from a user equipment accessing the relay device.

Or, optionally, in some embodiments, step S820 may specifically include:

configuring a downlink access link resource of the relay device based on information of a resource for a second access link, in a case that the relay resource configuration message carries the information of the resource for the second access link from the relay device to a user equipment accessing the relay device.

Or, optionally, in some embodiments, step S820 may specifically include:

configuring an uplink backhaul resource of the subordinate relay device based on information of a resource for a third backhaul, in a case that the relay resource configuration message carries the information of the resource for the third backhaul to the relay device from the subordinate relay device accessing the relay device.

Or, optionally, in some embodiments, step S820 may specifically include:

configuring a downlink backhaul resource of the subordinate relay device based on information of a resource for a fourth backhaul, in a case that the relay resource configuration message carries the information of the resource for the fourth backhaul from the relay device to the subordinate relay device.

Further, in some embodiments, step S820 may specifically include:

in a case that a carrier type of a first resource configured in the relay resource configuration message is a frequency division duplex (FDD) downlink carrier and the relay resource configuration message further indicates that a time domain resource of the first resource is a downlink backhaul time domain resource, configuring the first resource as a downlink backhaul time domain resource of the relay device.

Or, further, in some embodiments, step S820 may specifically include:

in a case that a carrier type of a second resource configured in the relay resource configuration message is an FDD downlink carrier and the relay resource configuration message further indicates that a time domain resource of the second resource is a downlink non-backhaul time domain resource, configuring the second resource as a downlink non-backhaul time domain resource of the relay device.

Or, further, in some embodiments, step S820 may specifically include:

in a case that a carrier type of a third resource configured in the relay resource configuration message is an FDD uplink carrier and the relay resource configuration message further indicates that a time domain resource of the third resource is an uplink backhaul time domain resource, configuring the third resource as an uplink backhaul time domain resource of the relay device.

Or, further, in some embodiments, step S820 may specifically include:

in a case that a carrier type of a fourth resource configured in the relay resource configuration message is an FDD uplink carrier and the relay resource configuration message further indicates that a time domain resource of the fourth resource is an uplink non-backhaul time domain resource, configuring the fourth resource as an uplink non-backhaul time domain resource of the relay device.

Or, further, in some embodiments, step S820 may specifically include:

in a case that a carrier type of a fifth resource configured in the relay resource configuration message is a time division duplex (TDD) carrier and the relay resource configuration message further indicates that a time domain resource of the fifth resource is an uplink backhaul time domain resource, configuring the fifth resource as an uplink backhaul time domain resource of the relay device.

Or, further, in some embodiments, step S820 may specifically include:

in a case that a carrier type of a sixth resource configured in the relay resource configuration message is a TDD carrier and the relay resource configuration message further indicates that a time domain resource of the sixth resource is a downlink backhaul time domain resource, configuring the sixth resource as a downlink backhaul time domain resource of the relay device.

Or, further, in some embodiments, step S820 may specifically include:

in a case that a carrier type of a seventh resource configured in the relay resource configuration message is a TDD carrier and the relay resource configuration message further indicates that a time domain resource of the seventh resource is a non-backhaul time domain resource, configuring the seventh resource as an access link time domain resource of the relay device.

In particular, in some embodiments, step S820 may specifically include:

in a case that the relay resource configuration message indicates that the time domain resource of the seventh resource is the non-backhaul time domain resource, configuring the seventh resource as a downlink access link time domain resource, an uplink access link time domain resource, or an uplink-and-downlink-variable access link time domain resource, of the relay device.

For the method performed by the relay device in the embodiments of the present disclosure, reference can be made to the method performed by the DU of the IAB in the first embodiment, or the method performed by the DU of the DIAB or the CU of the IAB in the second embodiment, which are not repeated.

Figure 9:
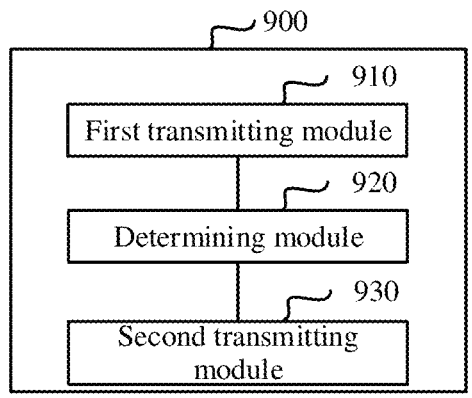
FIG. 9 is a schematic structural diagram of a device according to an embodiment of the present disclosure.

FIG. 9 is a schematic structural diagram of a device 900 according to an embodiment of the present disclosure. The device 900 is a device accessed by a relay device. As shown in FIG. 9, the device 900 may include:

a first transmitting module 910, configured to transmit a relay resource configuration message to the relay device, where the relay resource configuration message carries at least one of: information of a resource of a time window, information of a resource for a backhaul or information of a resource for an access link, of the relay device.

In the embodiments of the present disclosure, by transmitting the relay resource configuration message to the relay device, normal configuration and use of the relay resource of the relay device can be ensured, congestion and interference of network resources of the relay device can be avoided, and robustness of the relay communication can be improved.

Optionally, in some embodiments, the device 900 is a stand-alone DIAB device, and the relay device is a stand-alone IAB device.

Optionally, in some embodiments, the device 900 is a CU of an IAB, and the relay device is a DU of the IAB.

Optionally, in some embodiments, the device 900 is a CU of a DIAB, and the relay device is a DU of the DIAB.

Optionally, in some embodiments, the device 900 is a CU of a DIAB, and the relay device is a CU in an IAB accessing the DIAB.

Optionally, in some embodiments, the device 900 may include a determining module 920, configured to determine a relay resource of a DU of the DIAB and/or a relay resource of an IAB of the DIAB, based on relay resource demand information reported by the IAB of the DIAB.

Optionally, in some embodiments, a transmission time resource for transmitting the relay resource configuration message is before an earliest time resource configured by the relay resource configuration message, and a time interval between the transmission time resource and the earliest time resource is determined based on a backhaul latency and an internal processing latency of the relay device.

Further, in some embodiments, the backhaul latency is determined by the device 900 and/or the relay device through evaluating.

It should be understood that the internal processing latency of the relay device is determined based on the internal processing capability and the algorithm of the relay device, etc.

In addition, the backhaul latency may be evaluated and determined by the device 900, or evaluated and determined by the relay device, or evaluated and determined by both the device and the relay device.

Optionally, in some embodiments, the resource for the backhaul of the relay device includes at least one of the following:

a resource for a backhaul from the device 900 to the relay device in a time window; or, a resource for a backhaul from the relay device to the device 900 in a time window.

Optionally, in some embodiments, the resource for the access link of the relay device includes at least one of:

a resource that is not indicated to be used for backhaul transmission in a time window;

a resource for an access link to the relay device from a user equipment accessing the relay device;

a resource for an access link from the relay device to a user equipment accessing the relay device;

a resource for a backhaul to the relay device from a subordinate relay device accessing the relay device; or, a resource for a backhaul from the relay device to a subordinate relay device.

Optionally, in some embodiments, in a case that a carrier type of a first resource configured in the relay resource configuration message is an FDD downlink carrier, the relay resource configuration message further indicates that a time domain resource of the first resource is a downlink backhaul time domain resource or a downlink non-backhaul time domain resource.

Or, optionally, in some embodiments, in a case that a carrier type of a second resource configured in the relay resource configuration message is an FDD uplink carrier, the relay resource configuration message further indicates that a time domain resource of the second resource is an uplink backhaul time domain resource or an uplink non-backhaul time domain resource.

Or, optionally, in some embodiments, in a case that a carrier type of a third resource configured in the relay resource configuration message is a TDD carrier, the relay resource configuration message further indicates that a time domain resource of the third resource is an uplink backhaul time domain resource, a downlink backhaul time domain resource or a non-backhaul time domain resource.

Further, in some embodiments, in a case that the relay resource configuration message indicates that the time domain resource of the third resource is the non-backhaul time domain resource, the relay resource configuration message further indicates that the third resource is a downlink non-backhaul time domain resource, an uplink non-backhaul time domain resource, or an uplink-and-downlink-variable non-backhaul time domain resource.

Optionally, in some embodiments, the time window is allocated to the relay device in advance.

Or, optionally, in some embodiments, the time window is configured by the device 900 for the relay device.

Optionally, in some embodiments, the device 900 may further include a second transmitting module 930, configured to transmit a time window reconfiguration message to the relay device through RRC or MAC CE, where the time window reconfiguration message is used to reconfigure a time window resource available to the relay device.

The time window resource is indicated by a time window index or a time window bitmap.

The device provided by the embodiments of the present disclosure can implement various processes performed by the target device in the method embodiment of FIG. 7, and implement the method executed by the CU of the IAB in the first embodiment or the method executed by the CU of the DIAB in the second embodiment, which are not repeated in the embodiments of the present disclosure.

Figure 10:
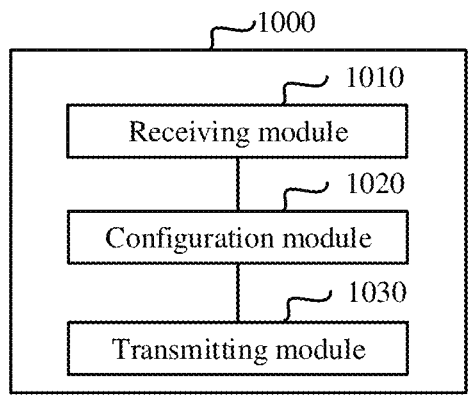
FIG. 10 is a schematic structural diagram of a relay device according to an embodiment of the present disclosure.

FIG. 10 is a schematic structural diagram of a relay device 1000 according to an embodiment of the present disclosure. As shown in FIG. 10, the relay device 1000 may include:

a receiving module 1010, configured to receive a relay resource configuration message, where the relay resource configuration message carries at least one of: information of a resource of a time window, information of a resource for a backhaul, or information of a resource for an access link, of the relay device 1000; and a configuration module 1020, configured to configure the resource for the backhaul and/or the resource for the access link of the relay device 1000, based on the relay resource configuration message.

In the embodiments of the present disclosure, the relay device receives the relay resource configuration message, and configures the relay resource of the relay device based on the relay resource configuration message, so as to ensure normal configuration and use of the relay resource of the relay device, avoid congestion and interference of network resources of the relay device, and improve robustness of the relay communication.

Optionally, in some embodiments, the relay device 1000 is a stand-alone IAB device, and a target device accessed by the relay device 1000 is a DIAB device accessed by the IAB device.

Or, optionally, in some embodiments, the relay device 1000 is a distributed unit DU of an IAB, and the target device is a centralized unit CU of the IAB.

Or, optionally, in some embodiments, the relay device 1000 is a DU of a DIAB, and the target device is a CU of the DIAB.

Or, optionally, in some embodiments, the relay device 1000 is a CU in an IAB, and the target device is a CU of a DIAB accessed by the IAB.

Optionally, in some embodiments, in a case that the relay device 1000 is the CU in the IAB and the target device is the CU of the DIAB accessed by the IAB, the relay device 1000 further includes: a transmitting module 1030, configured to transmit relay resource demand information of the IAB to the target device, where the relay resource demand information is used by the target device to coordinate relay resource configuration of a DU and/or the IAB under the target device.

Optionally, in some embodiments, the resource for the backhaul of the relay device 1000 includes at least one of the following:

a resource for a backhaul from a target device to the relay device 1000 in a time window; or, a resource for a backhaul from the relay device 1000 to a target device in a time window.

Further, in some embodiments, the configuration module 1020 may be specifically configured to:

configure a downlink backhaul resource of the relay device based on information of a resource for a first backhaul, in a case that the relay resource configuration message carries the information of the resource for the first backhaul from the target device to the relay device 1000 in the time window.

Or, further, in some embodiments, the configuration module 1020 may be specifically configured to: configure an uplink backhaul resource of the relay device based on information of a resource for a second backhaul, in a case that the relay resource configuration message carries the information of the resource for the second backhaul from the relay device 1000 to the target device in the time window.

Optionally, in some embodiments, the resource for the access link of the relay device 1000 includes at least one of:

a resource that is not indicated to be used for backhaul transmission in a time window;

a resource for an access link to the relay device 1000 from a user equipment accessing the relay device 1000;

a resource for an access link from the relay device 1000 to a user equipment accessing the relay device 1000;

a resource for a backhaul to the relay device 1000 from a subordinate relay device accessing the relay device 1000; or, a resource for a backhaul from the relay device 1000 to a subordinate relay device.

Further, in some embodiments, the configuration module 1020 may be specifically configured to:

configure the resource for the access link of the relay device based on information of the resource that is not indicated to be used for backhaul transmission in the time window, in a case that the relay resource configuration message carries the information of the resource that is not indicated to be used for backhaul transmission in the time window.

Or, optionally, in some embodiments, the configuration module 1020 may be specifically configured to:

configure an uplink access link resource of the relay device 1000 based on information of a resource for a first access link, in a case that the relay resource configuration message carries the information of the resource for the first access link to the relay device 1000 from a user equipment accessing the relay device 1000.

Or, optionally, in some embodiments, the configuration module 1020 may be specifically configured to:

configure a downlink access link resource of the relay device 1000 based on information of a resource for a second access link, in a case that the relay resource configuration message carries the information of the resource for the second access link from the relay device 1000 to a user equipment accessing the relay device 1000.

Or, optionally, in some embodiments, the configuration module 1020 may be specifically configured to:

configure an uplink backhaul resource of the subordinate relay device based on information of a resource for a third backhaul, in a case that the relay resource configuration message carries the information of the resource for the third backhaul to the relay device 1000 from the subordinate relay device accessing the relay device 1000.

Or, optionally, in some embodiments, the configuration module 1020 may be specifically configured to:

configure a downlink backhaul resource of the subordinate relay device based on information of a resource for a fourth backhaul, in a case that the relay resource configuration message carries the information of the resource for the fourth backhaul from the relay device 1000 to the subordinate relay device.

Further, in some embodiments, the configuration module 1020 may be specifically configured to:

in a case that a carrier type of a first resource configured in the relay resource configuration message is a frequency division duplex (FDD) downlink carrier and the relay resource configuration message further indicates that a time domain resource of the first resource is a downlink backhaul time domain resource, configure the first resource as a downlink backhaul time domain resource of the relay device 1000.

Or, further, in some embodiments, the configuration module 1020 may be specifically configured to:

in a case that a carrier type of a second resource configured in the relay resource configuration message is an FDD downlink carrier and the relay resource configuration message further indicates that a time domain resource of the second resource is a downlink non-backhaul time domain resource, configure the second resource as a downlink non-backhaul time domain resource of the relay device 1000.

Or, further, in some embodiments, the configuration module 1020 may be specifically configured to:

in a case that a carrier type of a third resource configured in the relay resource configuration message is an FDD uplink carrier and the relay resource configuration message further indicates that a time domain resource of the third resource is an uplink backhaul time domain resource, configure the third resource as an uplink backhaul time domain resource of the relay device 1000.

Or, further, in some embodiments, the configuration module 1020 may be specifically configured to:

in a case that a carrier type of a fourth resource configured in the relay resource configuration message is an FDD uplink carrier and the relay resource configuration message further indicates that a time domain resource of the fourth resource is an uplink non-backhaul time domain resource, configure the fourth resource as an uplink non-backhaul time domain resource of the relay device 1000.

Or, further, in some embodiments, the configuration module 1020 may be specifically configured to:

in a case that a carrier type of a fifth resource configured in the relay resource configuration message is a time division duplex (TDD) carrier and the relay resource configuration message further indicates that a time domain resource of the fifth resource is an uplink backhaul time domain resource, configure the fifth resource as an uplink backhaul time domain resource of the relay device 1000.

Or, further, in some embodiments, the configuration module 1020 may be specifically configured to:

in a case that a carrier type of a sixth resource configured in the relay resource configuration message is a TDD carrier and the relay resource configuration message further indicates that a time domain resource of the sixth resource is a downlink backhaul time domain resource, configure the sixth resource as a downlink backhaul time domain resource of the relay device 1000.

Or, further, in some embodiments, the configuration module 1020 may be specifically configured to:

in a case that a carrier type of a seventh resource configured in the relay resource configuration message is a TDD carrier and the relay resource configuration message further indicates that a time domain resource of the seventh resource is a non-backhaul time domain resource, configure the seventh resource as an access link time domain resource of the relay device 1000.

In particular, in some embodiments, the configuration module 1020 may be specifically configured to:

in a case that the relay resource configuration message indicates that the time domain resource of the seventh resource is the non-backhaul time domain resource, configure the seventh resource as a downlink access link time domain resource, an uplink access link time domain resource, or an uplink-and-downlink-variable access link time domain resource, of the relay device 1000.

The relay device 1000 provided by the embodiments of the present disclosure can implement various processes performed by the relay device in the method embodiment of FIG. 8, and implement the method executed by the DU of the IAB in the first embodiment or implement the method executed by the DU of the DIAB or the CU of the IAB in the second embodiment, which are not repeated in the embodiments of the present disclosure.

Figure 11:
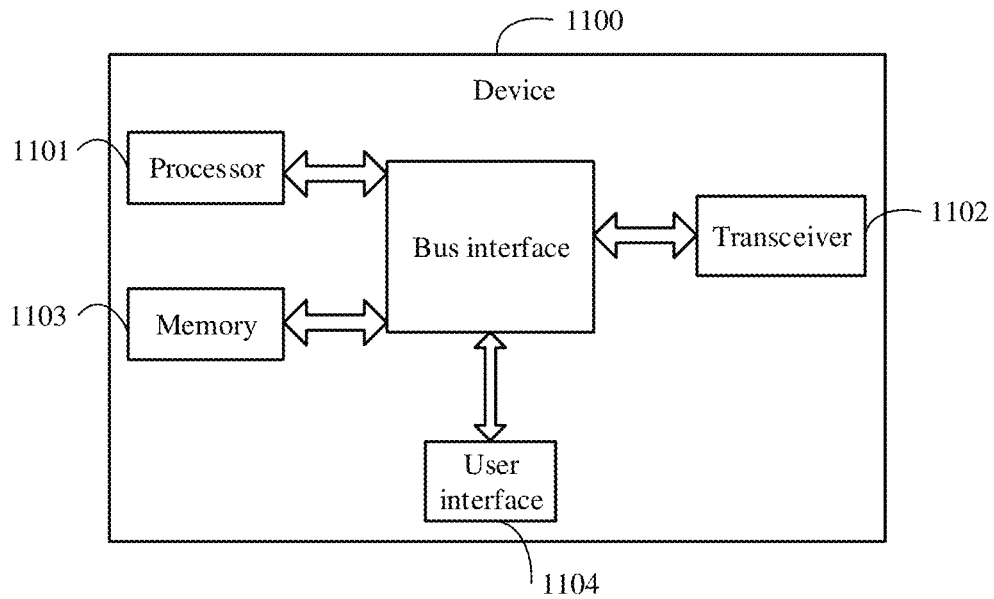
FIG. 11 is a structural diagram of a device to which embodiments of the present disclosure are applied.

Reference is made to FIG. 11. FIG. 11 is a structural diagram of a device 1000 to which embodiments of the present disclosure are applied. The device can implement the details of the method according to the embodiment shown in FIG. 7 and achieve the same effects. The device 1100 is a device accessed by a relay device. As shown in FIG. 11, the device 1100 includes: a processor 1101, a transceiver 1102, a memory 1103, a user interface 1104, and a bus interface.

In the embodiments of the present disclosure, the device 1100 further includes: a computer program stored in the memory 1103 and executable by the processor 1101, and the computer program is executed by the processor 1101 to perform the following steps:

transmitting a relay resource configuration message to a relay device, where the relay resource configuration message carries at least one of: information of a resource of a time window, information of a resource for a backhaul or information of a resource for an access link, of the relay device.

In FIG. 11, the bus architecture may include any quantity of interconnected buses and bridges, and various circuits such as one or more processors represented by the processor 1101 and a memory represented by the memory 1103 are connected to each other. The bus architecture may connect a variety of other circuits such as a peripheral, a voltage regulator and a power management circuit to each other, which is well known in the art, thus no further description thereof is provided herein. The bus interface is used to provide an interface. The transceiver 1102 may include multiple components, i.e., a transmitter and a receiver, which is used to provide a unit for communicating with other devices via a transmission medium. For different user equipments, the user interface 1104 may be an interface capable of connecting externally or internally to a required device, and the device which may be connected includes, but is not limited to: keypad, display, speaker, microphone, joystick and the like.

The processor 1101 is responsible for managing the bus architecture and normal operations, and the memory 1103 may store data being used by the processor 1101 during operation.

In the embodiments of the present disclosure, by transmitting the relay resource configuration message to the relay device, normal configuration and use of the relay resource of the relay device can be ensured, congestion and interference of the network resource of the relay device can be avoided, and robustness of the relay communication can be improved. Embodiments of the present disclosure also provide a computer-readable storage medium. A computer program is stored in the computer-readable storage medium. The computer program, when being executed by a processor, performs various processes of the above method embodiment in FIG. 7, which can achieve the same technical effects. To avoid repetition, details are not described herein. The computer-readable storage medium may be a read-only memory (Read-Only Memory, ROM), a random access memory (Random Access Memory, RAM), a magnetic disk or an optical disk, etc.

Figure 12:
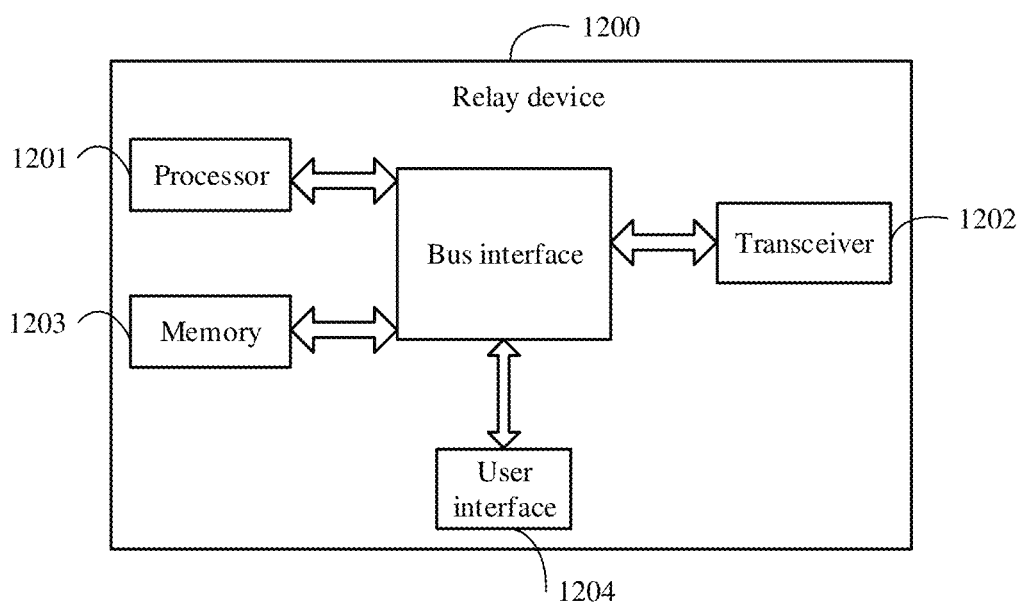
FIG. 12 is a structural diagram of a relay device to which embodiments of the present disclosure are applied.

Reference is made to FIG. 12. FIG. 12 is a structural diagram of a relay device 1200 to which embodiments of the present disclosure are applied. The relay device can implement the details of the method according to the embodiment shown in FIG. 8 and achieve the same effects. The device is a device accessed by the relay device. As shown in FIG. 12, the relay device 1200 includes: a processor 1201, a transceiver 1202, a memory 1203, a user interface 1204, and a bus interface.

In the embodiments of the present disclosure, the relay device 1200 further includes: a computer program stored in the memory 1203 and executable by the processor 1201, and the computer program is executed by the processor 1201 to perform the following steps:

receiving a relay resource configuration message, where the relay resource configuration message carries at least one of: information of a resource of a time window, information of a resource for a backhaul, or information of a resource for an access link, of the relay device; and configuring the resource for the backhaul and/or the resource for the access link of the relay device, based on the relay resource configuration message.

In FIG. 12, the bus architecture may include any quantity of interconnected buses and bridges, and various circuits such as one or more processors represented by the processor 1201 and a memory represented by the memory 1203 are connected to each other. The bus architecture may connect a variety of other circuits such as a peripheral, a voltage regulator and a power management circuit to each other, which is well known in the art, thus no further description thereof is provided herein. The bus interface is used to provide an interface. The transceiver 1202 may include multiple components, i.e., a transmitter and a receiver, which is used to provide a unit for communicating with other devices via a transmission medium. For different user equipments, the user interface 1204 may be an interface capable of connecting externally or internally to a required device, and the device which may be connected includes, but is not limited to: keypad, display, speaker, microphone, joystick and the like.

The processor 1201 is responsible for managing the bus architecture and normal operations, and the memory 1203 may store data being used by the processor 1201 during operation.

In the embodiments of the present disclosure, by transmitting the relay resource configuration message to the relay device, normal configuration and use of the relay resource of the relay device can be ensured, congestion and interference of the network resource of the relay device can be avoided, and robustness of the relay communication can be improved. Embodiments of the present disclosure also provide a computer-readable storage medium. A computer program is stored in the computer-readable storage medium. The computer program, when being executed by a processor, performs various processes of the above method embodiment in FIG. 8, which can achieve the same technical effects. To avoid repetition, details are not described herein. The computer-readable storage medium may be a read-only memory (Read-Only Memory, ROM), a random access memory (Random Access Memory, RAM), a magnetic disk or an optical disk, etc.

It should be noted that, in the present disclosure, the terms "include", "have" or any other variants thereof are meant to cover non-exclusive inclusion, so that a process, method, item or apparatus including a series of elements is not limited to those elements, and optionally includes other elements that are not specifically listed or that are inherent in the process, method, item or apparatus. With no other limitations, an element restricted by the phrase "include a . . . " does not exclude the existence of other identical elements in the process, method, item or apparatus including the element.

Through the descriptions of the above embodiments, those skilled in the art can clearly understand that the methods in the above embodiments may be implemented by means of software plus a needed universal hardware platform, and also may be implemented by hardware, but in many cases the former is preferred. Based on this understanding, the technical solution of the present disclosure that is essential or contributes to the related technologies may be embodied in the form of a software product that is stored in a storage medium (such as a ROM/RAM, a magnetic disk, or an optical disc), which includes instructions for enabling a terminal (which may be a mobile phone, a computer, a server, an air conditioner, or a network device) to execute the method described in the embodiments of the present disclosure.

The embodiments of the present disclosure are described in the above with reference to the drawings, and the present disclosure is not limited to the above specific implementations. The above specific implementations are illustrative rather than restrictive. Various forms can be made by those of ordinary skill in the art under the inspiration of the present disclosure, without departing from the purpose of the present disclosure and the protection scope of the claims, all of which fall within the protection of the present disclosure.

What is claimed is:

1. A method for configuring a relay resource, applied to a target device accessed by a relay device, comprising: transmitting a relay resource configuration message to the relay device, wherein the relay resource configuration message carries information of a resource for an access link of the relay device;

wherein the information of the resource for the access link of the relay device carried in the relay resource configuration message comprises at least one of:

information of a resource that is not indicated to be used for backhaul transmission in a time window;

information of a resource for a backhaul to the relay device from a subordinate relay device accessing the relay device; or, information of a resource for a backhaul from the relay device to a subordinate relay device;

wherein in a case that the target device is a centralized unit (CU) of a donor integrated access and backhaul (DIAB), before the transmitting the relay resource configuration message to the relay device, the method further comprises: determining at least one of a relay resource of a distributed unit (DU) of the DIAB or a relay resource of an integrated access and backhaul (IAB) of the DIAB, based on relay resource demand information reported by the IAB of the DIAB.

2. The method according to claim 1, wherein the relay resource configuration message further carries: information of a resource for a backhaul of the relay device, wherein the resource for the backhaul of the relay device comprises at least one of: a resource for a backhaul from the target device to the relay device in a time window, or, a resource for a backhaul from the relay device to the target device in a time window.

3. The method according to claim 1, wherein in a case that a carrier type of a first resource configured in the relay resource configuration message is a frequency division duplex (FDD) downlink carrier, the relay resource configuration message further indicates that a time domain resource of the first resource is a downlink backhaul time domain resource or a downlink non-backhaul time domain resource; or, in a case that a carrier type of a second resource configured in the relay resource configuration message is an FDD uplink carrier, the relay resource configuration message further indicates that a time domain resource of the second resource is an uplink backhaul time domain resource or an uplink non-backhaul time domain resource; or, in a case that a carrier type of a third resource configured in the relay resource configuration message is a time division duplex (TDD) carrier, the relay resource configuration message further indicates that a time domain resource of the third resource is an uplink backhaul time domain resource, a downlink backhaul time domain resource or a non-backhaul time domain resource.

4. The method according to claim 3, wherein in a case that the relay resource configuration message indicates that the time domain resource of the third resource is the non-backhaul time domain resource, the relay resource configuration message further indicates that the third resource is a downlink non-backhaul time domain resource, an uplink non-backhaul time domain resource, or an uplink-and-downlink-variable non-backhaul time domain resource.

5. The method according to claim 1, wherein the relay resource configuration message further carries: information of a resource for a backhaul of the relay device, and the information of the resource for the backhaul of the relay device carried in the relay resource configuration message comprises at least one of:

information of a resource for a backhaul from the target device to the relay device in a time window, or, information of a resource for a backhaul from the relay device to the target device in a time window.

6. The method according to claim 1, wherein in a case that the relay resource configuration message carries the information of the resource for the access link of the relay device, the method further comprises:

transmitting, to the relay device, information of a resource of a time window of the relay device and indication information indicating which time window resources are available.

7. The method according to claim 1, wherein the relay resource configuration message further carries information of a resource of a time window of the relay device.

8. A method for configuring a relay resource, applied to a relay device, comprising:

receiving a relay resource configuration message, wherein the relay resource configuration message carries information of a resource for an access link of the relay device; and configuring at least one of a resource for a backhaul or the resource for the access link of the relay device, based on the relay resource configuration message;

wherein the information of the resource for the access link of the relay device carried in the relay resource configuration message comprises at least one of:

information of a resource that is not indicated to be used for backhaul transmission in a time window;

information of a resource for a backhaul to the relay device from a subordinate relay device accessing the relay device; or, information of a resource for a backhaul from the relay device to a subordinate relay device;

wherein in a case that a target device is a centralized unit (CU) of a donor integrated access backhaul (DIAB) accessed by an integrated access and backhaul (IAB), before the receiving the relay resource configuration message, the method further comprises:

transmitting relay resource demand information of the IAB to the target device, wherein the relay resource demand information is used by the target device to coordinate relay resource configuration of at least one of a distributed unit (DU) or the IAB under the target device.

9. The method according to claim 8, wherein the relay resource configuration message further carries: information of the resource for the backhaul of the relay device, wherein the resource for the backhaul of the relay device comprises at least one of: a resource for a backhaul from a target device to the relay device in a time window, or, a resource for a backhaul from the relay device to a target device in a time window;

wherein the configuring at least one of the resource for the backhaul or the resource for the access link of the relay device based on the relay resource configuration message comprises:

configuring a downlink backhaul resource of the relay device based on information of a resource for a first backhaul, in a case that the relay resource configuration message carries the information of the resource for the first backhaul from the target device to the relay device in the time window; or, configuring an uplink backhaul resource of the relay device based on information of a resource for a second backhaul, in a case that the relay resource configuration message carries the information of the resource for the second backhaul from the relay device to the target device in the time window.

10. The method according to claim 8, wherein the configuring at least one of the resource for the backhaul or the resource for the access link of the relay device based on the relay resource configuration message comprises:

configuring the resource for the access link of the relay device based on information of the resource that is not indicated to be used for backhaul transmission in the time window, in a case that the relay resource configuration message carries the information of the resource that is not indicated to be used for backhaul transmission in the time window; or, configuring an uplink access link resource of the relay device based on information of a resource for a first access link, in a case that the relay resource configuration message carries the information of the resource for the first access link to the relay device from a user equipment accessing the relay device; or, configuring a downlink access link resource of the relay device based on information of a resource for a second access link, in a case that the relay resource configuration message carries the information of the resource for the second access link from the relay device to a user equipment accessing the relay device; or configuring an uplink backhaul resource of the subordinate relay device based on information of a resource for a third backhaul, in a case that the relay resource configuration message carries the information of the resource for the third backhaul to the relay device from the subordinate relay device accessing the relay device; or, configuring a downlink backhaul resource of the subordinate relay device based on information of a resource for a fourth backhaul, in a case that the relay resource configuration message carries the information of the resource for the fourth backhaul from the relay device to the subordinate relay device.

11. The method according to claim 8, wherein the configuring at least one of the resource for the backhaul or the resource for the access link of the relay device based on the relay resource configuration message comprises:

in a case that a carrier type of a first resource configured in the relay resource configuration message is a frequency division duplex (FDD) downlink carrier and the relay resource configuration message further indicates that a time domain resource of the first resource is a downlink backhaul time domain resource, configuring the first resource as a downlink backhaul time domain resource of the relay device; or, in a case that a carrier type of a second resource configured in the relay resource configuration message is an FDD downlink carrier and the relay resource configuration message further indicates that a time domain resource of the second resource is a downlink non-backhaul time domain resource, configuring the second resource as a downlink non-backhaul time domain resource of the relay device; or, in a case that a carrier type of a third resource configured in the relay resource configuration message is an FDD uplink carrier and the relay resource configuration message further indicates that a time domain resource of the third resource is an uplink backhaul time domain resource, configuring the third resource as an uplink backhaul time domain resource of the relay device; or, in a case that a carrier type of a fourth resource configured in the relay resource configuration message is an FDD uplink carrier and the relay resource configuration message further indicates that a time domain resource of the fourth resource is an uplink non-backhaul time domain resource, configuring the fourth resource as an uplink non-backhaul time domain resource of the relay device; or, in a case that a carrier type of a fifth resource configured in the relay resource configuration message is a time division duplex (TDD) carrier and the relay resource configuration message further indicates that a time domain resource of the fifth resource is an uplink backhaul time domain resource, configuring the fifth resource as an uplink backhaul time domain resource of the relay device; or, in a case that a carrier type of a sixth resource configured in the relay resource configuration message is a TDD carrier and the relay resource configuration message further indicates that a time domain resource of the sixth resource is a downlink backhaul time domain resource, configuring the sixth resource as a downlink backhaul time domain resource of the relay device; or, in a case that a carrier type of a seventh resource configured in the relay resource configuration message is a TDD carrier and the relay resource configuration message further indicates that a time domain resource of the seventh resource is a non-backhaul time domain resource, configuring the seventh resource as an access link time domain resource of the relay device.

12. The method according to claim 11, wherein the configuring at least one of the resource for the backhaul or the resource for the access link of the relay device based on the relay resource configuration message comprises: in a case that the relay resource configuration message indicates that the time domain resource of the seventh resource is the non-backhaul time domain resource, configuring the seventh resource as a downlink access link time domain resource, an uplink access link time domain resource, or an uplink-and-downlink-variable access link time domain resource, of the relay device.

13. A relay device, comprising a memory, a processor, and a program stored on the memory and executable by the processor, wherein the program, when being executed by the processor, performs steps of the method according claim 8.

14. The relay device according to claim 13, wherein the relay resource configuration message further carries: information of the resource for the backhaul of the relay device, wherein the resource for the backhaul of the relay device comprises at least one of: a resource for a backhaul from a target device to the relay device in a time window, or, a resource for a backhaul from the relay device to a target device in a time window.

15. The relay device according to claim 14, wherein the configuring at least one of the resource for the backhaul or the resource for the access link of the relay device based on the relay resource configuration message comprises:
configuring a downlink backhaul resource of the relay device based on information of a resource for a first backhaul, in a case that the relay resource configuration message carries the information of the resource for the first backhaul from the target device to the relay device in the time window; or,
configuring an uplink backhaul resource of the relay device based on information of a resource for a second backhaul, in a case that the relay resource configuration message carries the information of the resource for the second backhaul from the relay device to the target device in the time window.

16. The relay device according to claim 13, wherein the configuring at least one of the resource for the backhaul or the resource for the access link of the relay device based on the relay resource configuration message comprises:
configuring the resource for the access link of the relay device based on information of the resource that is not indicated to be used for backhaul transmission in the time window, in a case that the relay resource configuration message carries the information of the resource that is not indicated to be used for backhaul transmission in the time window; or,
configuring an uplink access link resource of the relay device based on information of a resource for a first access link, in a case that the relay resource configuration message carries the information of the resource for the first access link to the relay device from a user equipment accessing the relay device; or,
configuring a downlink access link resource of the relay device based on information of a resource for a second access link, in a case that the relay resource configuration message carries the information of the resource for the second access link from the relay device to a user equipment accessing the relay device; or
configuring an uplink backhaul resource of the subordinate relay device based on information of a resource for a third backhaul, in a case that the relay resource configuration message carries the information of the resource for the third backhaul to the relay device from the subordinate relay device accessing the relay device; or,
configuring a downlink backhaul resource of the subordinate relay device based on information of a resource for a fourth backhaul, in a case that the relay resource configuration message carries the information of the resource for the fourth backhaul from the relay device to the subordinate relay device.

17. The relay device according to claim 13, wherein the configuring at least one of the resource for the backhaul or the resource for the access link of the relay device based on the relay resource configuration message comprises:
in a case that a carrier type of a first resource configured in the relay resource configuration message is a frequency division duplex (FDD) downlink carrier and the relay resource configuration message further indicates that a time domain resource of the first resource is a downlink backhaul time domain resource, configuring the first resource as a downlink backhaul time domain resource of the relay device; or,
in a case that a carrier type of a second resource configured in the relay resource configuration message is an FDD downlink carrier and the relay resource configuration message further indicates that a time domain resource of the second resource is a downlink non-backhaul time domain resource, configuring the second resource as a downlink non-backhaul time domain resource of the relay device; or,
in a case that a carrier type of a third resource configured in the relay resource configuration message is an FDD uplink carrier and the relay resource configuration message further indicates that a time domain resource of the third resource is an uplink backhaul time domain resource, configuring the third resource as an uplink backhaul time domain resource of the relay device; or,
in a case that a carrier type of a fourth resource configured in the relay resource configuration message is an FDD uplink carrier and the relay resource configuration message further indicates that a time domain resource of the fourth resource is an uplink non-backhaul time domain resource, configuring the fourth resource as an uplink non-backhaul time domain resource of the relay device; or,
in a case that a carrier type of a fifth resource configured in the relay resource configuration message is a time division duplex (TDD) carrier and the relay resource configuration message further indicates that a time domain resource of the fifth resource is an uplink backhaul time domain resource, configuring the fifth resource as an uplink backhaul time domain resource of the relay device; or,
in a case that a carrier type of a sixth resource configured in the relay resource configuration message is a TDD carrier and the relay resource configuration message further indicates that a time domain resource of the sixth resource is a downlink backhaul time domain resource, configuring the sixth resource as a downlink backhaul time domain resource of the relay device; or,
in a case that a carrier type of a seventh resource configured in the relay resource configuration message is a TDD carrier and the relay resource configuration message further indicates that a time domain resource of the seventh resource is a non-backhaul time domain resource, configuring the seventh resource as an access link time domain resource of the relay device.

18. A device, wherein the device is configured to be accessed by a relay device, the device comprises a memory, a processor, and a program stored in the memory and executable by the processor, and the program, when being executed by the processor, performs a step of a method for configuring a relay resource, the method comprising:

transmitting a relay resource configuration message to the relay device, wherein the relay resource configuration message carries information of a resource for an access link of the relay device;

wherein the information of the resource for the access link of the relay device carried in the relay resource configuration message comprises at least one of:

information of a resource that is not indicated to be used for backhaul transmission in a time window;

information of a resource for a backhaul to the relay device from a subordinate relay device accessing the relay device; or, information of a resource for a backhaul from the relay device to a subordinate relay device;

wherein in a case that the target device is a centralized unit (CU) of a donor integrated access and backhaul (DIAB), before the transmitting the relay resource configuration message to the relay device, the method further comprises: determining at least one of a relay resource of a distributed unit (DU) of the DIAB or a relay resource of an integrated access and backhaul (IAB) of the DIAB, based on relay resource demand information reported by the IAB of the DIAB.

19. The device according to claim 18, wherein the relay resource configuration message further carries: information of a resource for a backhaul of the relay device, wherein the resource for the backhaul of the relay device comprises at least one of: a resource for a backhaul from the target device to the relay device in a time window, or, a resource for a backhaul from the relay device to the target device in a time window.

20. The device according to claim 18, wherein in a case that a carrier type of a first resource configured in the relay resource configuration message is a frequency division duplex (FDD) downlink carrier, the relay resource configuration message further indicates that a time domain resource of the first resource is a downlink backhaul time domain resource or a downlink non-backhaul time domain resource; or, in a case that a carrier type of a second resource configured in the relay resource configuration message is an FDD uplink carrier, the relay resource configuration message further indicates that a time domain resource of the second resource is an uplink backhaul time domain resource or an uplink non-backhaul time domain resource; or, in a case that a carrier type of a third resource configured in the relay resource configuration message is a time division duplex (TDD) carrier, the relay resource configuration message further indicates that a time domain resource of the third resource is an uplink backhaul time domain resource, a downlink backhaul time domain resource or a non-backhaul time domain resource.

\* \* \* \* \*